United States Patent
Megías Jimenez et al.

(10) Patent No.: US 11,494,866 B2
(45) Date of Patent: Nov. 8, 2022

(54) VIDEO WATERMARKING

(71) Applicant: FUNDACIÓ PER A LA UNIVERSITAT OBERTA DE CATALUNYA, Barcelona (ES)

(72) Inventors: David Megías Jimenez, Castelldefels (ES); Mehdi Fallahpour, San Diego, CA (US)

(73) Assignee: FUNDACIÓ PER A LA UNIVERSITAT OBERTA DE CATALUNYA, Barcelona (ES)

( * ) Notice: Subject to any disclaimer, the term of this patent is extended or adjusted under 35 U.S.C. 154(b) by 510 days.

(21) Appl. No.: 16/498,370

(22) PCT Filed: Mar. 29, 2017

(86) PCT No.: PCT/EP2017/057426
§ 371 (c)(1),
(2) Date: Sep. 26, 2019

(87) PCT Pub. No.: WO2018/177522
PCT Pub. Date: Oct. 4, 2018

(65) Prior Publication Data
US 2020/0043120 A1    Feb. 6, 2020

(51) Int. Cl.
*G06T 1/00* (2006.01)
*H04N 19/13* (2014.01)
(Continued)

(52) U.S. Cl.
CPC .......... *G06T 1/0057* (2013.01); *G06T 1/0042* (2013.01); *G06T 9/00* (2013.01);
(Continued)

(58) Field of Classification Search
CPC ....... G06T 1/0057; G06T 1/0042; G06T 9/00; G06T 2201/0061; H04N 19/13; H04N 19/176; H04N 19/467
See application file for complete search history.

(56) References Cited

U.S. PATENT DOCUMENTS

2007/0053438 A1\*  3/2007  Boyce et al. .......... H04N 11/04
                                                      375/240.24
2015/0347442 A1\*  12/2015  Lawrence ......... G06F 17/30153

FOREIGN PATENT DOCUMENTS

WO    WO 2015/028098 A1    3/2015

OTHER PUBLICATIONS

Fallahpour et al: "Tampering Detection in Compressed Digital Video Using Watermarking", IEEE Transactions on Instrumentation and Measurement, IEEE Service Center, Piscataway, NJ, US, vol. 63, No. 5, May 1, 2014 (May 1, 2014), pp. 1057-1072, XP011544527. May 1, 2014 (Year: 2014).\*

(Continued)

*Primary Examiner* — Gandhi Thirugnanam
*Assistant Examiner* — Michael Adam Shariff
(74) *Attorney, Agent, or Firm* — Squire Patton Boggs (US) LLP

(57) ABSTRACT

A method of embedding a bit or more of watermark data in a video signal to be entropy coded, wherein the video signal may be a block with levels, wherein the method may include: obtaining the watermark data; and obtaining a value of a first watermarked level on the basis of a first level of the block by processing the value of the first watermarked level. There also is a method of detecting a watermark in a video signal, the video signal having been entropy decoded and with a block with a first watermarked level, wherein the method may include: receiving the video signal; obtaining at least one bit of watermark data $w_i'$ on the basis of the first watermarked level; and determining a tampering indicator (Continued)

by verifying whether the obtained watermark data $w_i'$ corresponds with watermark data $w_i$.

20 Claims, 4 Drawing Sheets

(51) Int. Cl.
    *H04N 19/176*     (2014.01)
    *H04N 19/467*     (2014.01)
    *G06T 9/00*     (2006.01)

(52) U.S. Cl.
    CPC .......... *H04N 19/13* (2014.11); *H04N 19/176* (2014.11); *H04N 19/467* (2014.11); *G06T 2201/0061* (2013.01)

(56) References Cited

OTHER PUBLICATIONS

Fallahpour et al. "A realtime spatio-temporal watermarking scheme for H. 264/AVC." 2013 IEEE International Instrumentation and Measurement Technology Conference (I2MTC). IEEE, Jul. 15, 2013. (Year: 2013).*

Wang et al. "Fragile watermarking scheme for H. 264 video authentication." Optical Engineering 49.2 Feb. 1, 2010: 027003. (Year: 2010).*

Saadi et al. "Secure and Robust Copyright Protection for H. 264/AVC based on Selected Blocks DCT." SIGMAP 2008—Proceedings of the International Conference on Signal Processing and Multimedia Applications, Porto, Portugal, Jul. 26-29, 2008 (Year: 2008).*

Coatrieux, et al: "Reversible watermarking for knowledge digest embedding and reliability control in medical images", IEEE Transactions on Information Technology in Biomedicine; Mar. 2009; vol. 13, No. 2. 158-165; XP11345529A.

International Search Report and Written Opinion dated Jul. 19, 2017 for PCT Application No. PCT/EP2017/057426, 14 pages.

Fallahpour, et al: "Flexible image watermarking in JPEG domain", IEEE International Symposium on Signal Processing and Information Technology, IEEE,Dec. 12, 2016 (Dec. 12, 2016), pp. 311-316, XP033080717.

Fallahpour, et al: "Tampering Detection in Compressed Digital Video Using Watermarking", IEEE Transactions on Instrumentation and Measurement, IEEE Service Center, Piscataway, NJ, US,vol. 63, No. 5, May 1, 2014 (May 1, 2014), pp. 1057-1072, XP011544527.

Liu, et al: "A novel data hiding scheme for H.264/AVC video streams without intra-frame distortion drift", Communication Technology (ICCT), 2012 IEEE 14th International Conference on, IEEE, Nov. 9, 2012 (Nov. 9, 2012), pp. 824-828, XP032390372.

Ma, et al: "A Video Watermarking DRM Method Based on H.264 Compressed Domain with Low Bit-Rate Increasement", Chinese Journal of Electronics, Technology Exchange Ltd., Hong Kong, HK, vol. 25, No. 4, Jul. 1, 2016 (Jul. 1, 2016), pp. 641-647, XP006057867.

Noorkami, et al: "Compressed-domain video watermarking for H.264", Image Processing, 2005. ICIP 2005. IEEE International Conference on, IEEE, Piscataway, NJ, USA,IEEE, Sep. 1, 2005 (Sep. 1, 2005), pp. 1-4, XP002394794.

* cited by examiner

| DC | 1 | 5 | 6 |
|----|----|----|----|
| 2 | 4 | 7 | 12 |
| 3 | 8 | 11 | 13 |
| 9 | 10 | 14 | 15 |

VIDEO WATERMARKING

CROSS-REFERENCE

This application is a 35 U.S.C. 371 filing of International Application No. PCT/EP2017/057426 filed on Mar. 29, 2017, which is incorporated verbatim herein by reference in its entirety, including the specification, drawings and the claims.

TECHNICAL FIELD

The present disclosure relates to the watermarking of videos and more specifically to methods, devices and computer programs for using in watermarking of video signals.

BACKGROUND

With the fast development of information technology, electronic publishing, such as the distribution of digitized audio, images and videos, is becoming more and more popular. Digital multimedia content, such as videos, can easily be sent through the Internet to a cloud system. Particularly, data access over wireless networks from the data clouds has recently found increased popularity due to the fast growth of wireless multimedia applications.

Almost all digital video products today are distributed and stored in compressed format in order to make it easier sending and storing the information. There are several advanced video coding techniques such as H.264/AVC video coding standard which is a block-oriented motion-compensation-based video compression standard.

Cloud computing in today's world is making wide differences between it and other technologies. Cloud computing provides the capability to use the storage and computing resources on usage basis and reduce the investments and expenditures of the organizations information systems. However, when users are enjoying the capabilities of supercomputing and mass storage supplied by cloud computing, cloud security still remains a hot spot problem, which is in essence the authentication management between data owners and storage service providers. In cloud computing, storage service providers guarantee the authenticity and integrity of users' data from two main aspects. On the one hand, data cannot be revised, and damaged, or lost. This is the traditional problem of data security, which could be solved by many existing technical means (such as data backup, recovery backup, virus removal, data encryption, etc.). Security service centers need to intensively provide such services for a large number of data owners. This is one of the advantages brought by cloud computing. On the other hand, data owners care about whether the provider of data storage service will use their data, or reveal them to a third party without authorization. Therefore, the authentication management between data owners and storage services providers is a main problem in cloud security, which demands for an effective stipulation of data usage.

Multimedia security has become an increasingly major concern for cloud media data access control. It is important to ensure secure and reliable multimedia data transmissions between mobile and portable devices and the media cloud. Since the data may be transferred and stored in a cloud system through wireless, it becomes vulnerable to unauthorized disclosures, modifications, and replay attacks. These problems are related to tampering of video frames; tampering can be tampering can be classified into spatial, temporal or both. Spatial tampering refers to modifications in the frame, such as cropping and replacement, and content adding and removal For example, a user may upload his/her image to the media cloud when he/she is at home using the mobile phone. Later on, he/she wants to access the same media (e.g., an image) from the media cloud when he/she is at college or work. The question is how to assure the user that the media data has not been modified by others. It is reasonable that a cloud system can provide security access control. However, the cloud itself may not be trusted since it is managed by third parties such as cloud service providers. The security can only be guaranteed by contracts between users and cloud service providers. There are some potential risks, such as security attacks or misconduct of the cloud manager. Strictly speaking, users should only trust themselves rather than cloud security services.

Nowadays, cloud watermarking technologies are a convenient approach to solve the multimedia authentication management issue between data owners and storage service providers. Cloud watermarking is a digital watermarking technology based on the cloud model, which has been widely applied in text and relational databases. However, traditional cloud watermarking techniques have relevant drawbacks for verifying the users' data authenticity and integrity. The drawbacks are related to transparency, payload, security, bitrate and duration of the extraction of the watermark as will be explained in the following:

Known watermarking processes introduce perceptible artifacts into the original contents of a video. The quality of the video is not retained after adding the watermark and the watermark is not transparent to the user.

The known watermarking processes introduce such a large number of watermark data bits that they cannot be reliably embedded within a host signal per frame or per unit of time.

Video signals watermarked through the known watermarking processes may reveal clues about the watermarks in them.

The known processes of embedding watermarks into video frames provoke that the video frames increase their bitrate. This implies a major strain on hardware, particularly on devices such as smartphones, tablets, cameras and networks.

Detecting watermarks in video signals embedded through known methods can imply relatively slow and complex detection systems. A complete decompression is required to detect or vary the watermark embedded into the video signal.

It is an object of the present disclosure to provide examples of methods and devices for watermarking video signals that avoid or at least reduce the afore-mentioned drawbacks.

SUMMARY

In a first aspect, a method of embedding a watermark data in a video signal to be entropy coded is provided. The video signal may comprise at least one block with levels and the watermark data may comprise at least one bit. The method may comprise:
  obtaining watermark data (this action may be carried out for instance at an encoding device or the like);
  obtaining (for instance at the encoding device or the like) at least one value of a first watermarked level on the basis of at least one first level of the block by processing the value of the first watermarked level as:

$L'_a = f(L_a, w_i)$ wherein,

L'$_a$ stands for the value of the first watermarked level;

L$_a$ stands for the first level;

w$_i$ stands for the watermark data;

wherein $f(L_a, w_i)$ may be defined such that the first level L$_a$ may be obtainable on the basis of the first watermarked level and may be processable as:

$$L_a = h(f(L_a, w_i), w_i)$$

This method of embedding may be used after relatively complex and time consuming procedures of compression and before lossless entropy coding of the video signal, such that the chance of losing watermark data is avoided.

If the user wants to vary the watermark once embedded, only a relatively simple and fast entropy decoding is required. A compressed video signal does not need to be decompressed completely and compressed again. The required computation time is therefore reduced. Hence, the requirements of hardware resources can be reduced and power consumption may be also reduced which is a main issue when it comes to portable devices such as tablets, smartphones, mobile phones or cameras.

This method of embedding does not alter the number of levels of a block, which helps to keep the bitrate the same as the original without watermarking embedding. Lower numbers of bitrate may put less strain on hardware, which may become important for devices such as smartphones and netbooks.

This method of embedding may be a part of an encoding process of the video signal where blocks with levels are generated during compression, and subsequent decoding process, so the watermark may be embedded at an encoding device site and detected later at a decoding device site. This configuration may take advantage of some popular codecs such as H.264/AVC.

By implementing this method of embedding, the watermark embedded into the video signal may be reversible since there the original first level is obtainable from the first watermarked level.

That method of embedding allows a good trade-off between capacity, transparency and bitrate, as it is the main challenge for video watermarking applications; i.e., a very high capacity and transparent scheme is obtained with very little changes in bitrate.

According to some examples the method of embedding may further comprise, before obtaining the value of a first watermarked level:

selecting at least one block which comprises, in a position greater than a predetermined threshold position, a level different from zero (this action may be carried out for instance at a decoding device or the like);

using the latest non-zero level of the block as a basis for obtaining the watermarked level (this action may be carried out for instance at a decoding device or the like).

The non-zero levels may be modified because changing a zero level to a non-zero level can change the bit rate enormously since Context-Adaptive Variable-Length Coding (CAVLC) is very sensitive to the levels.

The threshold position may be predetermined depending on the needs of each particular application. This may allow an easy adjustment of the properties of the embedded watermark.

According to another aspect, a computer program is disclosed. The computer program may comprise program instructions for causing an encoding device (or any other type of computing device) to perform a method of embedding a watermark data in a video signal as described above. The computer program may be embodied on a storage medium (for example, a CD-ROM, a DVD, a USB drive, on a computer memory or on a read-only memory) or carried on a carrier signal (for example, on an electrical or optical carrier signal).

According to another aspect, an encoding device is disclosed. The encoding device may comprise:

means for obtaining watermark data;

means for obtaining at least one value of a first watermarked level on the basis of at least one first level of a block by processing the value of the first watermarked level as:

$$L'_a = f(L_a, w_i)$$

wherein,

L'$_a$ stands for the value of the first watermarked level;

L$_a$ stands for the first level;

w$_i$ stands for the watermark data;

wherein $f(L_a, w_i)$ may be defined such that the first level L$_a$ may be obtainable on the basis of the first watermarked level and may processable as:

$$L_a = h(f(L_a, w_i), w_i)$$

wherein the block is comprised in a video signal to be entropy coded and the watermark data comprises at least one bit.

At this point it is important to note that the described means may be, for example, electronic means, computing means or a combination of both.

According to yet another aspect, an encoding device is disclosed. The encoding device may comprise a memory and a processor, embodying instructions stored in the memory and executable by the processor, the instructions comprising functionality to execute a method of embedding a watermark data in a video signal as described in some examples herein.

In another aspect, a method of detecting a watermark in a video signal is described. The video signal may have been entropy decoded and may comprise at least one block with at least one first watermarked level and the watermark data may comprise at least one bit. The method may comprise:

receiving the video signal (this action may be carried out for instance at a decoding device or the like);

obtaining watermark data w$_i$' on the basis of the first watermarked level (this action may be carried out for instance at a decoding device or the like);

determining a tampering indicator by verifying whether the obtained watermark data w$_i$' corresponds with a watermark data w$_i$ embedded by a method of embedding watermark according to any of examples herein disclosed (this action may be carried out for instance at a decoding device or the like);

This way, it is possible to easily determine whether the video signal has been modified by any unauthorized third party. The owner or authorized user may be informed about any security attack or misconduct of the cloud manager when the obtained watermark data w$_i$' does not correspond with a watermark data w$_i$ embedded.

To detect the watermark data w$_i$' just entropy decoding may be enough, which make the method of detecting relatively fast and very useful for real-time applications. Also, since it is not a complex operation, this method of detecting may be suitable for portable devices where power consumption is very important.

If the watermark data has to be modified, the compressed video signal may not need to be decompressed completely and compressed again. Just entropy decoding and coding again may be enough for modifying the watermark data. This is a very convenient feature, since, after a complex and time-consuming compression, the watermark data can be modified unlimitedly without recompression.

In some examples, the method of detecting a watermark in a video signal may further comprise:

recovering at least one first level from the block on the basis of the watermarked level of the entropy decoded video signal. This action may be carried out for instance at a decoding device;

The at least one first level may be completely recovered from on the basis of the watermarked level. Therefore, the user can watch the decompressed video with the same quality as the original video before compressing it. The video signal is not damaged.

According to another aspect, a computer program is disclosed. The computer program may comprise program instructions for causing a decoding device to perform a method of detecting a watermark in a video signal as disclosed herein. The computer program may be embodied on a storage medium (for example, a CD-ROM, a DVD, a USB drive, on a computer memory or on a read-only memory) or carried on a carrier signal (for example, on an electrical or optical carrier signal).

According to another aspect, a decoding device is disclosed. The decoding device may comprise:

means for receiving an entropy decoded video signal, wherein the video signal comprises a block with a first watermarked level;

means for obtaining watermark data $w_i'$ on the basis of the first watermarked level of the block of the video signal;

means for determining a tampering indicator by verifying whether the obtained watermark data $w_i'$ corresponds with a watermark data $w_i$ embedded by a method of embedding watermark according to any of claims 1 to 10;

In some examples, the decoding device as described herein may further comprise:

means for recovering at least one first level from the block on the basis of a level of the entropy decoded video signal.

At this point it is important to note that the described means may be, for example, electronic means, computing means or a combination of both.

In another aspect, a decoding device is disclosed. The decoding device may comprise a memory and a processor, embodying instructions stored in the memory and executable by the processor, the instructions comprising functionality to execute the method for detecting a watermark in a video signal as described herein.

Additional objects, advantages and features of embodiments of the invention will become apparent to those skilled in the art upon examination of the description, or may be learned by practice of the invention.

BRIEF DESCRIPTION OF THE DRAWINGS

Non-limiting examples of the present disclosure will be described in the following, with reference to the appended drawings, in which:

FIG. 4 schematically illustrates an exemplary 4×4 block of a video signal.

DETAILED DESCRIPTION OF EXAMPLES

Figure 1:
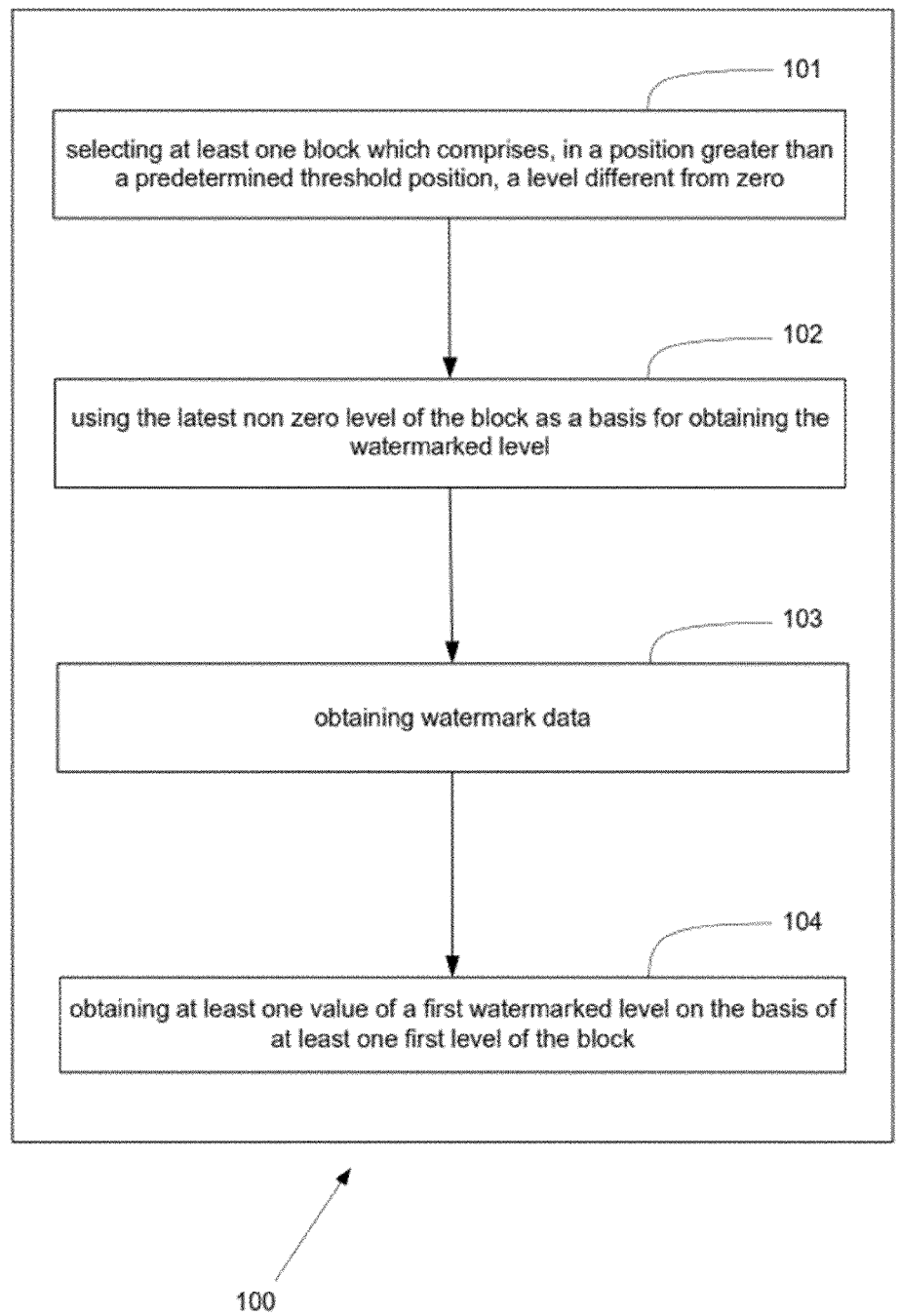
FIG. 1 illustrates a flow chart of a method of embedding a watermark data in a video signal according to some examples.

FIG. 1 illustrates a flow chart of a method of embedding 100 a watermark data in a video signal. Although FIG. 1 shows a specific sequence, it should be understood that other sequences may be followed not deviating from the scope of the present disclosure.

The present disclosure may take advantage of the H.264/AVC encoding/decoding process. In some examples the method of embedding 100 may be a part of the H.264/AVC encoding process.

Particular details of H.264/AVC video coding will not be fully described herein as it is a well-known standard for those skilled in the art.

A "video signal" as used herein refers to any signal which comprises video information.

The expression "encoding device" as used herein refers to any device able to convert data from one format to another, with the aim of compressing of a video signal. The encoding device may comprise any logic, software or the like configured to carry out the compression. By way of example, the encoding device may be a mobile phone, a smartphone, a tablet, a laptop, a camera or the like.

The expression "decoding device" as used herein refers to any device able to convert data from one format to another, with the aim of decompressing of a video signal. The decoding device may comprise any logic, software or the like configured to carry out the decompression. By way of example, the decoding device may be a mobile phone, a smartphone, a tablet, a laptop, a camera or the like.

Figure 4:
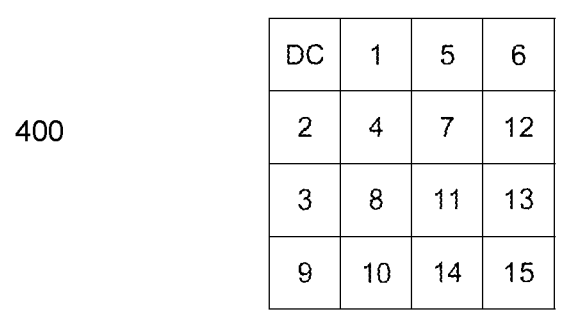

The method of embedding 100 is aimed to embed the watermark data (not illustrated) in a video signal (not illustrated) which is to be entropy coded. In the disclosed method of embedding 100, some QDCT (Quantized Discrete Cosine Transform) coefficients, also known as levels, of some blocks are manipulated to embed the watermark data. By way of example, QDCT coefficients of 4×4 blocks will be used to describe possible implementations. QDCT coefficients of 4×4 blocks may be usually in the high or mid frequency bands. FIG. 4 schematically illustrates an exemplary 4×4 block 400 of a video signal.

The method of embedding 100 may be performed after a quantization phase of H.264 encoding, which is before entropy encoding.

The video signal comprises at least one block with levels, the block may belong to a macroblock, and the watermark data may comprise at least one bit.

The method of embedding 100 described in some examples may be executed for each block of a macroblock and for all the respective macroblocks of the frames of the video signal. However, in some examples only some macroblocks might be chosen to execute the method of embedding 100.

According to some examples, the method of embedding 100 may comprise:

obtaining watermark data 103. The watermark data 103 may be obtained for instance through a pseudo-random number generator (PRNG). The watermark data may be also provided as a predefined sequence of bits which may be adapted to a predetermined length, i. e. adapted to the length of at least a portion of the video signal to be watermarked;

obtaining at least one value of a first watermarked level $L'_a$ on the basis of at least one first level $L_a$ of the block 104 by processing the value of the first watermarked level $L'_a$ as:

$$L'_a = f(L_a, w_i)$$

wherein, $L'_a$ stands for the value of the first watermarked level;
$L_a$ stands for the first level;
$w_i$ stands for the watermark data;
wherein $f(L_a, w_i)$ may be defined such that the first level $L_a$ may be obtained on the basis of the first watermarked level and may be processable as:

$$L_a = h(f(L_a, w_i), w_i)$$

Therefore the value of the first watermarked level $L'_a$ may be processed as a function of the first level $L_a$ and watermark data $w_i$.

An embedding function $f(L_a, w_i)$ may be defined as reversible if there exists another function h—called the reversing function—such that $h(f(L_a, w_i), w_i) = L_a$ for all possible values of $L_a$ and $w_i \in \{0,1\}$.

Before obtaining the value of a first watermarked level, the method of embedding 100 may comprise:

selecting at least one block which may comprise, in a position greater than a predetermined threshold T position, a level different from zero 101. Levels of each block of the macroblock may be checked looking for those levels whose value differs from zero and whose position is greater than the threshold T position. If all the levels of the block whose position is greater than the threshold T position show a value of zero, then that block cannot be selected for embedding the watermark data. The same occurs if all the levels of the block show a value of zero. Threshold T position may be defined depending on each case, for instance if T is equal to or greater than 9, only high frequency area of the video signal is used for embedding. By decreasing the value of T more blocks in each macroblock may be used for embedding, which in turns increases the distortion;

using the latest non-zero (LNZ) level of the block as a basis for obtaining the watermarked level 102. Following the example above, if T=9, a block with its LNZ level located at position 12 may be selected and the level at position 12 may be used for obtaining the watermarked level.

If a block is not selected for embedding it may be left as is.

Each watermark bit of the watermark data $w_i$ may be embedded in a selected block and for the next selected block a next watermark data $w_{i+1}$ may be used.

In H.264/AVC compression, changing the quantization parameter (QP) results in varying the value and position of non-zero levels in macroblocks. When QP is relatively low, there are more non-zero levels compared to relatively high QP. In other words, if QP is high the compression rate is high (the video clip is very compressed). Thus, when QP is low, watermark embedding may result in more capacity, and when QP is high, the provided capacity may be lower.

According to some examples, to make the method of embedding 100 robust against collusion attacks, watermark data may be encrypted through at least one encryption operation E on the basis of a secret stream of bits S (raw watermark data $w_i$) and a key K by processing a value of the encrypted watermark data $w_{ENC}$ as:

$$w_{ENC} = E(K, S)$$

The encrypted watermark data $w_{ENC}$ may be used instead of the raw watermark data $w_i$ for being embedding into the host video signal.

According to further examples, to make the method of embedding 100 even more robust against collusion attacks, instead of using a unique key K as described above, the key K may be regenerated based on macroblocks (MB's) features. In order to prevent computational complexity, H.264/AVC codec information may be used for generating a key K for each MB. In 4×4 intra prediction, nine modes are classified into three groups: 1) vertical and diagonal modes (0, 3, 4, 5, 7), 2) horizontal modes (1, 6, 8), and 3) dc mode (2). As similar modes may be changed to each other after re-encoding, categorizing them makes the public key more robust in case of alternations. For 3 modes, two bits may be needed and assigned for each mode. Thus, for instance a 32-bit content-based key K may be regenerated for a MB which comprises sixteen 4×4 blocks. Also for 16×16 intra-prediction, there are four modes for which, based on the prediction mode, a 32-bit content-based key K may be generated. For example, in 4×4 intra prediction, for the first, second and third group we can assign "00", "01", and "10", respectively. Also, a 32 bit key starting with "11" can be used for 16×16 intra-prediction mode. In fact the user's key may be combined with a generated key for each MB to provide a unique key for each MB based on user's key.

According to some examples, the value of the first watermarked level $L'_a$ may be processed as:

$$L'_a = f(L_a, w_i) = \begin{cases} L_a + 1, & \text{if } L_a > l_0, \\ L_a + w_i, & \text{if } L_a = l_0, \\ L_a, & \text{if } -l_0 < L_a < l_0, \\ L_a - w_i, & \text{if } L_a = -l_0, \\ L_a - 1, & \text{if } L_a < -l_0. \end{cases}$$

wherein, $l_0$ stands for a positive value.

This example may be called as "coefficient shifting".

In some examples, the positive value $l_0$ may be 1. This value is the most likely value for the LNZ coefficient in a macroblock and then may be the best choice as capacity is concerned (i. e. a larger number of macroblocks may be selected for embedding, on average).

In further examples, the value of the first watermarked level $L'_a$ may processed as:

$$L'_a = f(L_a, w_i) = 2L_a + w_i$$

This example may be called as "coefficient expansion".

According to some examples, the method of embedding 100 may further comprise:

obtaining a value of a second watermarked level $L'_b$ on the basis of a second level $L_b$ of a block, wherein the values of the first and second watermarked levels may be obtained by processing them as:

$$(L'_a, L'_b) = f(L_a, L_b, w_i) = (L_a + d^+ + w_i, L_b - d^-)$$

wherein,
L'$_b$ stands for the value of a second watermarked level;
L$_b$ stands for a second level;
and, $$d = L_a - L_b$$

and, $$d^+ = \left\lceil \frac{d}{2} \right\rceil$$

wherein $\lceil \bullet \rceil$ stands for a round operation towards positive infinite;
and, $$d^- = \left\lfloor \frac{d}{2} \right\rfloor$$

wherein $\lfloor \bullet \rfloor$ stands for a round operation towards negative infinite.

According to that example, it may be assumed without loss of generality, that $L_a \geq L_b$ (if $L_a < L_b$, swap the roles of $L_a$ and $L_b$).
Let $d = L_a - L_b$. From here, we may define:

$$d^+ = \left\lceil \frac{d}{2} \right\rceil \text{ and } d^- = \left\lfloor \frac{d}{2} \right\rfloor = d - d^+.$$

So, for embedding:

$$(L'_a, L'_b) = f(L_a, L_b, w_i) = (L_a + d^+ + w_i, L_b - d^-).$$

Then, the difference between L'$_a$ and L'$_b$ may be twice the difference d between L$_a$ and L$_b$, plus the embedded bit w$_i$, i.e. d'=L'$_b$−L'$_a$=2d+w$_i$. The difference between the coefficients has thus been expanded, hence this example may be called as "coefficient difference expansion".

In some examples, each of the first and second levels may be selected from different blocks of the video signal or the same block. Both first and second levels should be different from zero, otherwise, for instance if one of them were equal to zero, that block could not be used for embedding.

According to some other examples, the method of embedding 100 may further comprise:
obtaining a value of a second watermarked level L'$_b$ on the basis of a second level L$_b$ of a block, wherein the values of the first and second watermarked levels may be obtained by processing them as:

$$(L'_a, L'_b) = f(L_a, L_b, w_i) = [L_a L_b + w_i, L_a]$$

wherein,
L'$_b$ stands for the value of a second watermarked level;
L$_b$ stands for a second level;
wherein $L_a > 1$ It may be assumed without loss of generality, that $L_a \geq L_b$ (if $L_a < L_b$, swap the roles of L$_a$ and L$_b$ in the description above).

The processing of the first and the second watermarked level may be carried out with integers or with elements of a multiplicative group modulo p, for a prime number $p > L_a$.

This example may be called as "coefficient multiplicative expansion".

In some examples, each of the first and second levels may be selected from different blocks of the video signal or the same block. Both first and second levels should be different from zero, otherwise, for instance if one of them were equal to zero, that block could not be used for embedding.

Figure 3:
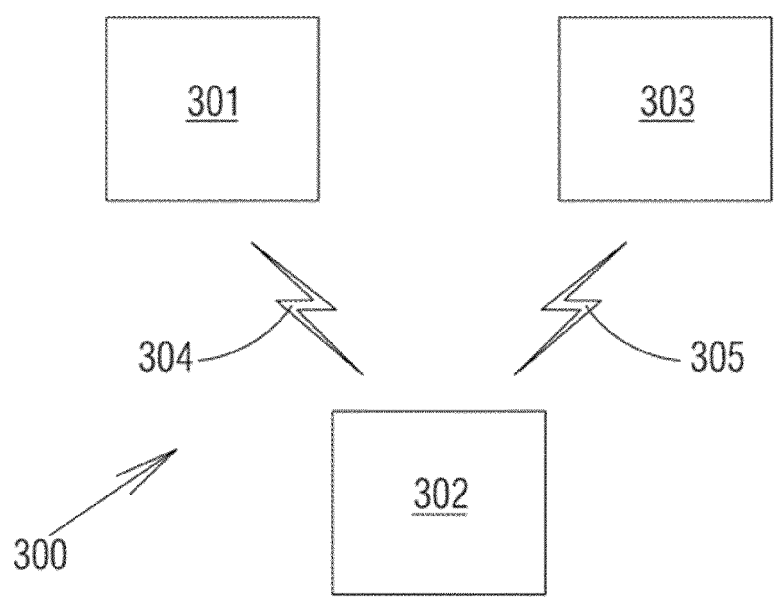
FIG. 3 schematically illustrates a watermarking system comprising an encoding and decoding device according to some examples.

FIG. 3 schematically illustrates a watermarking system 300 comprising an encoding and decoding device 301, 303. According to some examples, the encoding device (or watermark embedder) 301 and the decoding device 302 (or watermark detector) may be in data communication with a server 303 or the like which may be configured to host the video signal (not illustrated). The data communication may be achieved for instance through a wireless network 304, 305 or a wired network (not illustrated).

Some examples of the encoding device 301 are described in the following and some examples of the decoding device 303 will be described later on.

According to some examples, the encoding device 301 may be able to reproduce the method of embedding 100 described above, for example, by means of electronic and/or computing means. Said electronic/computing means may be used interchangeably, that is, a part of the described means may be electronic means and the other part may be computing means, or all described means may be electronic means or all described means may be computing means.

Examples of an encoding device 301 comprising only electronic means (that is, a purely electronic configuration) may be a programmable electronic device such as a CPLD (Complex Programmable Logic Device), an FPGA (Field Programmable Gate Array) or an ASIC (Application-Specific Integrated Circuit).

In examples where the encoding device 301 comprises electronic means, said encoding device 301 may comprise:
means for obtaining watermark data;
means for obtaining at least one value of a first watermarked level on the basis of at least one first level of a block by processing the value of the first watermarked level as:

$$L'_a = f(L_a, w_i)$$

wherein,
L'$_a$ stands for the value of the first watermarked level;
L$_a$ stands for the first level;
w$_i$ stands for the watermark data;
wherein $f(L_a, w_i)$ may be defined such that the first level L$_a$ may be obtainable on the basis of the first watermarked level and is processable as:

$$L_a = h(f(L_a, w_i), w_i)$$

wherein the block is comprised in a video signal to be entropy coded and the watermark data comprises at least one bit.

In examples where the encoding device 301 comprises only computing means, said encoding device 301 may comprise a memory and a processor, embodying instructions stored in the memory and executable by the processor, the instructions comprising functionality to execute a method of embedding 100 a watermark data in a video signal according to examples described herein.

According to further examples, a computer program may comprise program instructions for causing an encoding device 301 to perform a method of embedding 100 a watermark data in a video signal according to examples described herein. The computer program may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the method of embedding 100. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

The encoding device 301 which may be used for watermark embedding may be a H.264/AVC encoder which solves any problem of robustness against H.264/AVC compression and also leads to very low complexity, since the proposed method of embedding 100 uses QDCT blocks which may be already computed by the H.264/AVC encoder.

Figure 2:
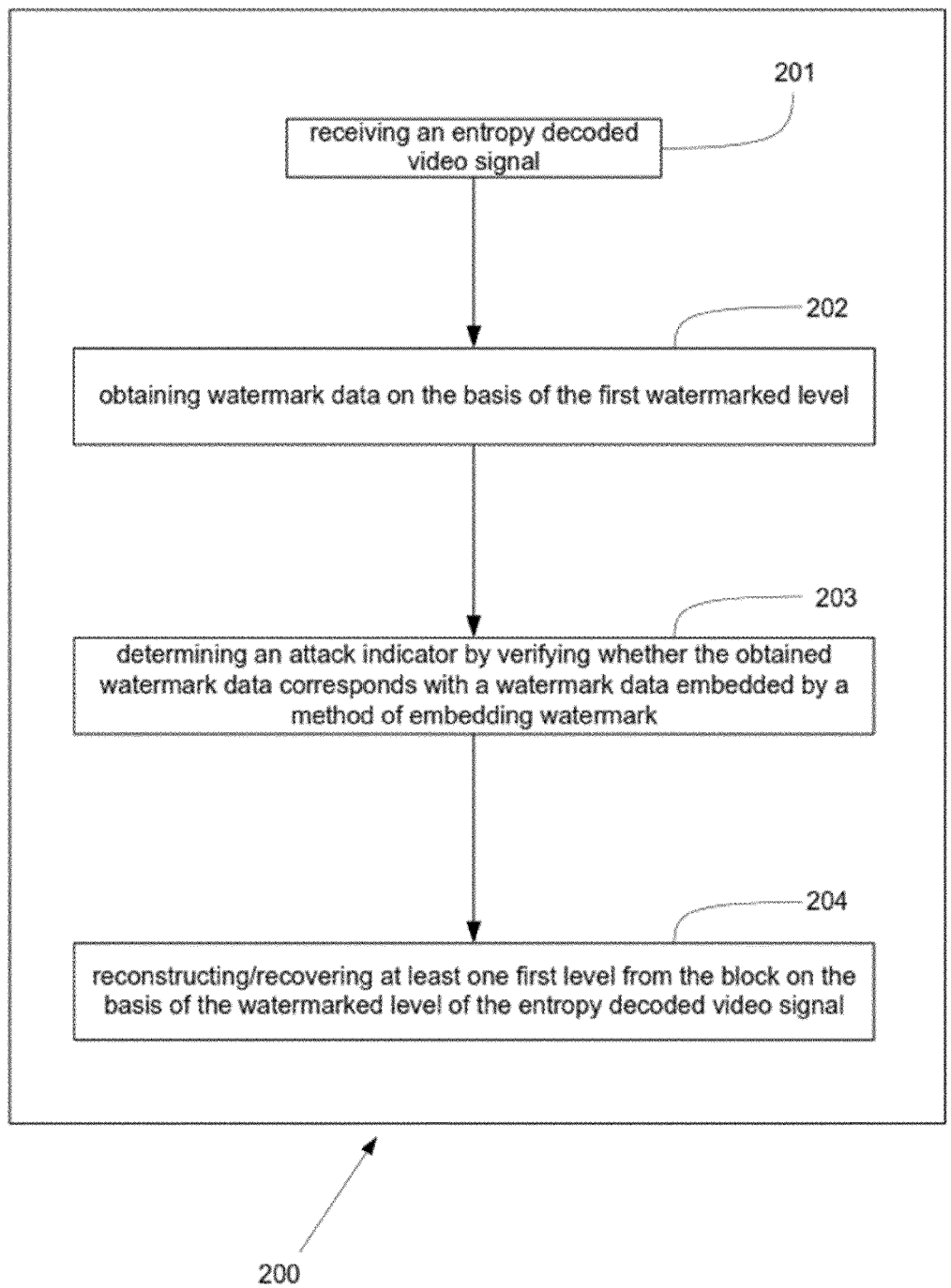
FIG. 2 illustrates a flow chart of a method of detecting a watermark in a video signal according to some examples.

FIG. 2 illustrates a flow chart of a method of detecting 200 a watermark in a video signal according to some examples. The video signal have been entropy decoded and may comprise at least one block with at least one first watermarked level and the watermark data may comprise at least one bit.

Although FIG. 2 shows a specific sequence, it should be understood that other sequences may be followed not deviating from the scope of the present disclosure.

According to some examples, the method of detecting 200 may comprise:

receiving the video signal 201. As mentioned above, the video signal has been entropy decoded;

obtaining watermark data $w_i'$ on the basis of the first watermarked level 202.

determining a tampering indicator by verifying whether the obtained watermark data $w_i'$ corresponds with a watermark data $w_i$ embedded by a method of embedding 100 watermark 203 according to any example described herein. If the obtained watermark data $w_i'$ does not correspond with the watermark data $w_i$ embedded previously (for instance when compressing the video signal) the tampering indicator may provide information about that difference. Otherwise, the tampering indicator may inform about a correspondence between the obtained watermark data $w_i'$ and the watermark data $w_i$ embedded previously.

In some examples, after determining a tampering indicator, the method of detecting may further comprise:

determining an attack indicator by detecting positions of sparse binary errors relative to each other at least in a macroblock. Depending on the value of the tampering indicator, for instance in case of a difference between the obtained watermark data $w_i'$ and the watermark data $w_i$ embedded previously, the method of detecting 200 may trigger a process of determining the position of possible sparse binary errors relative to each other at least in a macroblock in order to determine whether such errors are spread randomly or are concentrated in a specific area. If errors are concentrated then the attack indicator may inform about an attack (for instance due to a space tampering), otherwise attack indicator may inform about other events such as common video processing operations. These operations may comprise H.264/AVC recompression, noise, and brightness increasing. The position of the errors may be determined among different frames.

Therefore, malicious attacks may be distinguished from video processing operations through some examples of the method of detecting 200.

The amount of secret bits that can be embedded into each frame may depend on the threshold, T, quantization values and other coding parameters. For a QCIF frame, which has 99 MB's, if we want to embed 3 bits into each MB we need to provide capacity equal to 99×3×30=8910 bits per second. It is worth to mention that the number of bits that we can embed into MBs of a frame can be different. However, adjusting the threshold T can provide the minimum required capacity.

Also, to detect the temporal tampering, a number such as a frame index may be added into each frame.

According to further examples, obtaining watermark data $w_i'$ 202 from at least one block of the video signal may comprise:

processing a value of the watermark data $w_i'$ as:

$$w_i' = g(\tilde{L}_a)$$

wherein, $\tilde{L}_a$ stands for a first watermarked level of the block of the video signal having been entropy decoded.

The embedding function $f(L_a, w_i)$ may be defined as blind if there exists another function g—called the extracting function—such that $g(f(L_a, w_i)) = w_i$ for all possible values of $L_a$ and $w_i \in \{0,1\}$.

According to examples, before obtaining watermark data $w_i'$ on the basis of the first watermarked level, the method of detecting 200 may comprise:

selecting at least one block which may comprise, in a position greater than a predetermined threshold position T, a level different from zero. By implementing this block the position values of LNZ levels for 16 blocks of the MB may be found;

using the latest non-zero level of the block as a basis for obtaining the watermark data $w_i'$.

The predetermined threshold position T may be adjusted as needed and may be the same as the threshold position T for the method of embedding 100.

In some examples, the value of the watermark data $w_i'$ may be processed as:

$$w_i' = g(\tilde{L}_a) = \begin{cases} 0, & \text{if } \tilde{L}_a = l_0 \text{ or } \tilde{L}_a = -l_0, \\ 1, & \text{if } \tilde{L}_a = l_0 + 1 \text{ or } \tilde{L}_a = -l_0 - 1, \\ \text{there is no watermark bit}, & \text{if } \tilde{L}_a \neq l_0, -l_0, l_0 + 1, -l_0 - 1. \end{cases}$$

wherein, $l_0$ stands for a positive value of a level.

The positive value of the level $l_0$ may be 1.

In further examples, the value of the watermark data $w_i'$ may be processed as:

$$w_i' = g(\tilde{L}_a) = \tilde{L}_a \bmod 2$$

wherein "mod" stands for a positive modulo operation.

According to some examples, the watermark data $w_i'$ may be obtained on the basis of at least the first and a second watermarked level of the video signal, wherein a value of the watermark data $w_i'$ may be obtained by processing it as:

$$w_i' = g(\tilde{L}_a, \tilde{L}_b) = \tilde{d} \bmod 2$$

wherein,
$\tilde{L}_b$ stands for the second level of the block of the video signal having been entropy decoded;

$$\tilde{d}=\tilde{L}_a-\tilde{L}_b; \text{ and}$$

"mod" stands for a positive modulo operation.

Each of the first and second watermarked levels may be selected from different blocks of the entropy decoded video signal.

In further examples, the watermark data $w_i$ may be obtained on the basis of at least the first and a second watermarked level of the video signal, wherein a value of the watermark data $w_i'$ may be obtained by processing it as:

$$w_i'=g(\tilde{L}_a,\tilde{L}_b)=\tilde{L}_a \bmod \tilde{L}_b$$

wherein,
$\tilde{L}_b$ stands for the second level of the block of the video signal having been entropy decoded; and
"mod" stands for a positive modulo operation.

Each of the first and second watermarked levels may be selected from different blocks of the entropy decoded video signal.

In some other examples, the method of detecting 200 may further comprise:
recovering at least one first level from the block on the basis of the watermarked level of the entropy decoded video signal 204.

According to some examples, reconstructing/recovering at least the first level from the block 204 may comprise:
processing a value of the first level $L''_a$ as:

$$L''_a = h(\tilde{L}_a, w_i')$$

wherein,
$\tilde{L}_a$ stands for a first watermarked level of the block of the video signal having been entropy decoded;

The embedded watermark bits may be extracted in a decoding process of H.264/AVC, where the quantized DCT levels for each MB are entropy decoded.

In further examples, the value of the first level $L''_a$ may be obtained by processing it as:

$$L''_a = h(\tilde{L}_a) = \begin{cases} \tilde{L}_a - 1, & \text{if } \tilde{L}_a > l_0, \\ \tilde{L}_a, & \text{if } -l_0 < L_a < l_0, \\ \tilde{L}_a + 1, & \text{if } \tilde{L}_a < -l_0. \end{cases}$$

wherein,
$l_0$ stands for a positive value of a level, for instance 1.

According to examples, the value of the first level $L''_a$ may obtained by processing it as:

$$L''_a = h(\tilde{L}_a) = \left\lfloor \frac{\tilde{L}_a}{2} \right\rfloor$$

wherein $\lfloor \cdot \rfloor$ stands for a round operation towards negative infinite.

In further examples, the method of detecting 200 may further comprise:
recovering a second level from the block on the basis of a second level of the entropy decoded video signal, wherein values of the first and second levels $L''_a$, $L''_b$ may be obtained by processing them as:

$$(L''_a, L''_b) = h(\tilde{L}_a, \tilde{L}_b, w_i') = \left( \tilde{L}_a - \left\lceil \frac{\hat{d}}{2} \right\rceil - w_i', \tilde{L}_b + \left\lfloor \frac{\hat{d}}{2} \right\rfloor \right)$$

wherein,
$\tilde{L}_b$ stands for the second level of the block of the video signal having been entropy decoded;

$$\hat{d} = \frac{\tilde{d}-w_i'}{2} \text{ and } \tilde{d} = \tilde{L}_a - \tilde{L}_b$$

wherein $\lceil \cdot \rceil$ stands for a round operation towards positive infinite;
wherein $\lfloor \cdot \rfloor$ stands for a round operation towards negative infinite.

According to some examples, the method of detecting 200 may further comprise:
recovering a second level from the block on the basis of a second level of the entropy decoded video signal, wherein values of the first and second levels $L''_a$, $L''_b$ may be obtained by processing them as:

$$(L''_a, L''_b) = h(\tilde{L}_a, \tilde{L}_b, w_i') = \left( \tilde{L}_b, \frac{\tilde{L}_a - w_i'}{\tilde{L}_b} \right)$$

wherein,
$\tilde{L}_b$ stands for the second level of the block of the video signal having been entropy decoded.

According to some examples, the decoding device 303 may be able to reproduce the method of detecting 200 described above, for example, by means of electronic and/or computing means. Said electronic/computing means may be used interchangeably, that is, a part of the described means may be electronic means and the other part may be computing means, or all described means may be electronic means or all described means may be computing means.

Examples of a decoding device 302 comprising only electronic means (that is, a purely electronic configuration) may be a programmable electronic device such as a CPLD (Complex Programmable Logic Device), an FPGA (Field Programmable Gate Array) or an ASIC (Application-Specific Integrated Circuit).

In examples where the decoding device 303 comprises electronic means, said decoding device 303 may comprise:
means for receiving an entropy decoded video signal, wherein the video signal comprises a block with a first watermarked level;
means for obtaining watermark data $w_i'$ on the basis of the first watermarked level of the block of the video signal;
means for determining a tampering indicator by verifying whether the obtained watermark data $w_i'$ corresponds with a watermark data $w_i$ embedded by a method of embedding 100 watermark according to any of examples described herein;

In further examples, the decoding device 303 may further comprise:
means for recovering at least one first level from the block on the basis of a level of the entropy decoded video signal.

In examples where the decoding device 303 comprises computing means, said decoding device 303 may comprise a memory and a processor, embodying instructions stored in the memory and executable by the processor, the instructions comprising functionality to execute a method of detecting 200 a watermark data in a video signal according to examples described herein.

According to further examples, a computer program may comprise program instructions for causing a decoding device 303 to perform a method of detecting 200 a watermark data in a video signal according to examples described herein. The computer program may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the method of detecting 200. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

In general, efficiency, complexity, energy usage and simplicity are more important in the decoder implementation, since it is at the client side with limited resources compared to the server 302 side which has more resources. Also, some delay in the encoding device 301 may acceptable since it is done only once for a video signal. So, low complexity and simplicity in implementation are even more critical points in designing the decoding device 303. One advantage of the proposed methods is their simplicity in implementation at the decoding device 303, allowing it to run for various real-time applications.

According to an example, the method of embedding 100 a watermark may be implemented at the encoding device 301 after compression of the video signal and before the entropy coding. The encoding device 301 may be any device as described above. The compression of the video signal may be achieved using an exemplary standard such a H.264.

The method of embedding 100 according to any example described herein may be applied at least in a block, or in each block of a macroblock. The exemplary method of embedding 100 may be also implemented in each block for each macroblock of a slide of the video signal. However, the following description is based only for a 4×4 block for the sake of clarity and simplicity.

As mentioned above, a block may be selected for embedding the watermark data taking into account whether the block comprises in a position greater than a predetermined threshold position, a level different from zero. Once a block is selected the latest non-zero level of the block may be used as a basis for obtaining the watermarked level.

The watermark data may be generated for instance, by a pseudo-random number generator (PRNG), or alternatively, a sequence of bits may be provided as mentioned above; the raw watermark data may be consequently encrypted as described above.

If the key is generated based on intra prediction modes in the encoding device 301, it may be re-generated in the decoding device 303, as well.

A value of a first watermarked level may be obtained by processing it as a function of a first level of the block and the watermark data. The way of processing the value of the first watermarked level may be follow any example as disclosed herein.

The watermarked video signal may be ready for being entropy coded and sent from the encoding device 301 to the server 302 through the network 304.

According to an example, the method of detecting 200 a watermark may be implemented at the decoding device 303 on the video signal after entropy decoding the quantized DCT levels for each block. The watermarked video signal may sent from the sever 302 to the decoding device 303 through the network 305 when a user wants to watch a file comprising the video signal. The decoding device 303 may be any device as described above.

The entropy decoded watermarked video signal may be received. At least one block may be selected which may comprise, in a position greater than a predetermined threshold position, a level different from zero. The latest non-zero level of the block may be used as a basis for obtaining the watermark data $w_i'$.

The watermark data $w_i'$ may be obtained on the basis of the first watermarked level following any example as described herein. A tampering indicator may be determined by verifying whether the obtained watermark data $w_i'$ corresponds with a watermark data $w_i$ embedded previously in the video signal. This watermark data $w_i$ may be embedded in the video signal following any exemplary method of embedding 100 as disclosed herein.

Depending on the tampering indicator which has been determined, i. e. whether a difference between the obtained watermark data $w_i'$ and the watermark data $w_i$ embedded previously has been determined, the method of detecting 200 may also comprise determining an attack indicator by detecting positions of sparse binary errors relative to each other at least in a block as has been described above. It is not necessary to check all the frames of the video signal for determining an attack indicator but determine which parts of a frame have been modified and to identify the reason for modifications.

The method of detecting 200 may also comprise recovering at least one first level from the block on the basis of the watermarked level of the entropy decoded video signal. The watermark data may be extracted from the entropy decoded signal. The ways of recovering the first level from the watermarked level has been disclosed above. The method of detecting 200 may be applied for each block comprised in a video signal.

After implementing the method of detecting 200, the decompression of the video signal may be achieved using an exemplary standard such a H.264. However, depending on the tampering indicator and the attack indicator, i. e. on the basis thereof, the user may refuse following with the decompression of the video or even the method of detecting 200 may automatically prevent from decompressing the video signal if an attack has been determined. Alternatively, once an attack is determined the method of detecting 200 may no longer follow because if a watermarked level has been tampered, the recovered level from the entropy decoding video signal may not correspond with the original level.

In some examples, if no watermark data is detected by the method of detecting 200 in the entire video signal or a predetermined portion thereof, the decoding device 303 may be prevented from decompressing the video signal and consequently the unauthorized user is not allow to watch the video. Alternatively, if no watermark data is detected by the method of detecting 200 the decoding device 303 may decompress the video signal but the video may be shown in a relatively poor quality.

The method of embedding 100 and detecting 200 according to the examples described herein, are robust against attacks such as dropping, jittering, and delay since detecting and extracting the secret bits of the watermark data may be only based on each single frame and independent from other frames. This is very useful for network applications, for which these attacks can happen frequently.

In the following some experimental results and analysis are developed on the basis of implementations of the herein described methods of embedding and detecting.

The value of each first watermarked level $L'_a$ will be processed in the experiment as:

$$L'_a = f(L_a, w_i) = \begin{cases} L_a + 1, & \text{if } L_a > l_0, \\ L_a + w_i, & \text{if } L_a = l_0, \\ L_a, & \text{if } -l_0 < L_a, l_0, \\ L_a - w_i, & \text{if } L_a = -l_0, \\ L_a - 1, & \text{if } L_a < -l_0. \end{cases}$$

wherein, $l_0$ stands for a positive value, such as 1.

The value of the watermark data $w_i'$ will be processed in the experiment as:

$$w_i' = g(\tilde{L}_a) = \begin{cases} 0, & \text{if } \tilde{L}_a = l_0 \text{ or } \tilde{L}_a = -l_0, \\ 1, & \text{if } \tilde{L}_a = l_0 + 1 \text{ or } \tilde{L}_a = -l_0 - 1, \\ \text{there is no watermark bit}, & \text{if } \tilde{L}_a \neq l_0, -l_0, l_0 + 1, -l_0 - 1. \end{cases}$$

wherein, $l_0$ stands for a positive value of a level.

The positive value of the level $l_0$ is 1.

The value of the first level $L''_a$ will be obtained by processing it in the experiment as:

$$L''_a = h(\tilde{L}_a) = \begin{cases} \tilde{L}_a - 1, & \text{if } \tilde{L}_a > l_0, \\ \tilde{L}_a, & \text{if } -l_0 < L_a < l_0, \\ \tilde{L}_a + 1, & \text{if } \tilde{L}_a < -l_0. \end{cases}$$

wherein, $l_0$ stands for a positive value of a level, for instance 1.

We have implemented and integrated the proposed embedding and detecting method into the H.264/AVC reference software JM12.2. Four standard video sequences (Foreman, Tennis, Container and Football) in QCIF format (176×144 pixels) are used for our simulations. As we embed the watermark in 16×16 MBs, the embedding algorithm is independent of the resolution of the video. In other words, increasing the resolution increases payload with same transparency. Some important configuration parameters of our tests are given in Table 1.

TABLE 1

Configuration parameters of the JM software

| Profile | Baseline |
|---|---|
| Level | 3 |
| Intra Period | 1 |
| Frame Rate | 30 |
| Rate Distortion Optimization | On |
| Number of encoded frames | 100 |

The experimental results are divided into three parts. In the first part, the transparency of the proposed methods is presented. The second part shows the capacity and bitrate of the proposed scheme. Security and tempering will be presented in the third part.

Transparency

To measure the transparency of the proposed system, subjective and objective techniques may be used. Unmarked H.264 compressed/decompressed frames were compared with watermarked H.264 compressed/decompressed frames. Comparing sequences were produced to highlight the differences between both series of frames and no significant visible distortion were observed in any sequences, meeting the transparency requirement In addition to these subjective tests, objective measurements help us to prove the transparency of the embedding process.

Table 2 shows the PSNR for 60 frames of each test sequence with three different QP values and different threshold T. The last 4 rows are the average of the PSNR of 4 sequences. The overall average results for all three QPs show a quality degradation of 0.47 dB in terms of PSNR.

TABLE 2

Transparency for average of 60 frames for 4 video sequences with different QP and different threshold

| | | QP = 24 | QP = 29 | QP = 34 |
|---|---|---|---|---|
| Foreman | Original | 39.1 | 34.7 | 31.6 |
| | T = 1 | 38.4 | 33.9 | 30.9 |
| | T = 6 | 38.7 | 34.2 | 31.1 |
| | T = 10 | 38.9 | 34.5 | 31.4 |
| Tennis | Original | 38.5 | 33.5 | 31.5 |
| | T = 1 | 37.7 | 32.7 | 30.6 |
| | T = 6 | 37.9 | 33 | 31 |
| | T = 10 | 38.2 | 33.2 | 31.3 |
| Container | Original | 39.4 | 36.2 | 32.2 |
| | T = 1 | 38.8 | 35.6 | 31.5 |
| | T = 6 | 39.0 | 35.8 | 31.8 |
| | T = 10 | 39.1 | 36.0 | 32.0 |
| Football | Original | 37.8 | 33.4 | 30.3 |
| | T = 1 | 37.0 | 32.6 | 29.7 |
| | T = 6 | 37.3 | 32.9 | 29.9 |
| | T = 10 | 37.6 | 33.1 | 30.1 |
| Average | Original | 38.7 | 34.45 | 31.4 |
| | T = 1 | 37.975 | 33.7 | 30.675 |
| | T = 6 | 38.225 | 33.975 | 30.95 |
| | T = 10 | 38.45 | 34.2 | 31.2 |

Bitrate and Capacity

Tables 3 and 4 show capacity and bitrate where threshold T and QP vary. Table 3 shows that the average change bit rate is 0.00001337%, which is excellent for a video watermarking system in compressed domain.

Table 4 presents capacity of different video sequences with different QP and threshold T. Also it provides the average capacity per frame and the ratio of embedded bits into levels to amount of all changed levels. When T=1, the average is 507.23 bits, for T=6, the average is 207.67 bits and, when T=10, the average capacity per frame is 72.07 bits. Thus the average for all thresholds is 262.32 bits per frame and 2.64 per MB.

TABLE 3

Bit-rate for average of 60 frames for 4 video sequences different QP and different threshold

|  |  | QP = 24 | | QP = 29 | | QP = 34 | |
| --- | --- | --- | --- | --- | --- | --- | --- |
|  |  | Bits per sec | Difference change ratio | Bits per sec | Difference change ratio | Bits per sec | Difference change ratio |
| Foreman | Original | 1016600 | — | 632372 | — | 402516 | — |
|  | T = 1 | 1019020 | 0.002380 | 634660 | 0.003618 | 403188 | 0.001669 |
|  | T = 6 | 1016988 | 0.000382 | 632868 | 0.000784 | 402540 | 0.000060 |
|  | T = 10 | 1016416 | −0.000181 | 632372 | 0.000000 | 402516 | 0.000000 |
| Tennis | Original | 1397136 | — | 764060 | — | 380388 | — |
|  | T = 1 | 1400180 | 0.002179 | 765996 | 0.002534 | 381692 | 0.003428 |
|  | T = 6 | 1399880 | 0.001964 | 765024 | 0.001262 | 380452 | 0.000168 |
|  | T = 10 | 1397924 | 0.000564 | 764168 | 0.000141 | 380392 | 0.000011 |
| Container | Original | 1087884 | — | 690748 | — | 444560 | — |
|  | T = 1 | 1090220 | 0.002147 | 693752 | 0.004349 | 445404 | 0.001899 |
|  | T = 6 | 1089576 | 0.001555 | 691700 | 0.001378 | 444756 | 0.000441 |
|  | T = 10 | 1088648 | 0.000702 | 690808 | 0.000087 | 445504 | 0.002123 |
| Football | Original | 2041480 | — | 1253744 | — | 713984 | — |
|  | T = 1 | 2046292 | 0.002357 | 1257264 | 0.002325 |  | 0.002325 |
|  | T = 6 | 2046460 | 0.002439 | 1256436 | 0.000728 |  | 0.000728 |
|  | T = 10 | 2044288 | 0.001375 | 1254324 | 0.000006 |  | 0.000006 |
| Average | Original | 1385775 | — | 835231 | — | 485362 | — |
|  | T = 1 | 1388928 | 0.0023 | 837918 | 0.00321 | 307571 | 0.00233 |
|  | T = 6 | 1388226 | 0.0016 | 836507 | 0.00104 | 306937 | 0.00035 |
|  | T = 10 | 1386819 | 0.0006 | 835418 | 0.00006 | 307103 | 0.00054 |

TABLE 4

Capacity for average of 60 frames for 4 video sequences different QP and different threshold

|  |  | QP = 24 | | | | QP = 29 | | | | QP = 34 | | | |
| --- | --- | --- | --- | --- | --- | --- | --- | --- | --- | --- | --- | --- | --- |
|  | T | Total Capacity | Total changed | Ratio | Capacity Per frame | Total Capacity | Total changed | Ratio | Capacity Per frame | Total Capacity | Total changed | Ratio | Capacity Per frame |
| Foreman | 1 | 37763 | 41517 | 0.91 | 629.4 | 29693 | 31667 | 0.94 | 494.9 | 17557 | 18190 | 0.97 | 292.6 |
|  | 6 | 19961 | 21958 | 0.91 | 332.7 | 5754 | 6229 | 0.92 | 95.9 | 585 | 593 | 0.99 | 9.8 |
|  | 10 | 2083 | 2365 | 0.88 | 34.7 | 62 | 62 | 1.00 | 1.0 | 0 | 0 | 0 | 0.0 |
| Tennis | 1 | 50056 | 54573 | 0.92 | 834.3 | 34850 | 36687 | 0.95 | 580.8 | 9657 | 10720 | 0.90 | 161.0 |
|  | 6 | 20769 | 24849 | 0.84 | 346.2 | 5645 | 6507 | 0.87 | 94.1 | 1636 | 1805 | 0.91 | 27.3 |
|  | 10 | 3623 | 5024 | 0.72 | 60.4 | 841 | 1082 | 0.78 | 14.0 | 137 | 151 | 0.91 | 2.3 |
| Container | 1 | 23143 | 27299 | 0.85 | 385.7 | 18874 | 21310 | 0.89 | 314.6 | 17881 | 19646 | 0.91 | 298.0 |
|  | 6 | 13300 | 16126 | 0.82 | 221.7 | 9919 | 10951 | 0.91 | 165.3 | 2966 | 3134 | 0.95 | 49.4 |
|  | 10 | 6417 | 8071 | 0.80 | 107.0 | 1629 | 1761 | 0.93 | 27.2 | 14681 | 16107 | 0.91 | 244.7 |
| Football | 1 | 43767 | 50264 | 0.87 | 729.5 | 49574 | 53539 | 0.93 | 826.2 | 32400 | 34352 | 0.94 | 540.0 |
|  | 6 | 36284 | 44958 | 0.81 | 604.7 | 22596 | 26610 | 0.85 | 376.6 | 10130 | 11078 | 0.91 | 168.8 |
|  | 10 | 15391 | 23365 | 0.66 | 256.5 | 6254 | 8072 | 0.77 | 104.2 | 779 | 871 | 0.89 | 13.0 |
| Average | 1 | 38682 | 43413 | 0.89 | 644.7 | 33247 | 35800 | 0.93 | 554.1 | 19373 | 20727 | 0.93 | 322.9 |
|  | 6 | 22578 | 26972 | 0.85 | 376.3 | 10978 | 12574 | 0.89 | 182.9 | 3829 | 4152 | 0.94 | 63.8 |
|  | 10 | 6878 | 9706 | 0.77 | 114.6 | 2196 | 2744 | 0.87 | 36.6 | 3899 | 4282 | 0.68 | 65.0 |

Security and Tampering

To provide a very secure method, pseudo-random number generators (PRNG) are used to generate the secret bit stream. The watermark bit stream is constructed as the XOR of the raw watermark and the key. To make it even more secure, the key may be generated based on the texture of each macroblock, thus each macroblock has its own key. Using different QP in the encoding device 301 and the decoding device 303 results in changing intra-prediction modes in the decoding thus the key will be different and the watermark stream cannot be extracted correctly.

An attacker would have following difficult challenges to avoid tamper detection:

The attacker needs to have both the original and marked video to find the modified QDCT values. This is highly unlikely that an attacker can access the original video to discover the changes.

In the very rare case that an attacker has access to the original video clip and finds the modified QDCT, he/she must keep the LNZ level and change the other levels to prevent tamper detection. But it is very difficult, if not practically impossible, to avoid it, because:

The embedding and extracting processes work based on the last non-zero levels in each selected block.

The encryption key is generated based on the levels and content of the blocks.

Thus any change in the levels will be detected at the method of detecting 200.

Therefore, it is practically impossible for an attacker to avoid tamper detection.

In addition to the above, the experience of the applicant leads to the following points.

The performance of the watermarking system 300 may be improved by applying error-correcting codes (ECCs). The type of ECC and repeating depends on the application's requirements. For instance, surviving against Gaussian noise needs a good ECC whereas increasing the repeating time increases robustness against burst errors.

Using non-zero QDCT levels is more robust compared with schemes that use DCT before quantization, since some of the modified levels may convert to zero after quantization.

It should be noted that the properties (transparency, capacity and security) of the proposed, examples of embedding and detecting methods are adjustable. In fact, the parameters of embedding and detecting can be chosen based on usage requirements Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

Further, although the examples described with reference to the drawings comprise computing apparatus/systems and processes performed in computing apparatus/systems, the invention also extends to computer programs, particularly computer programs on or in a carrier, adapted for putting the system into practice.

For reasons of completeness, various aspects of the present disclosure are set out in the following numbered clauses:

Clause 1: A method of embedding a watermark data in a video signal to be entropy coded, wherein the video signal comprises at least one block with levels and the watermark data comprises at least one bit, the method comprises:
obtaining watermark data;
obtaining at least one value of a first watermarked level on the basis of at least one first level of the block by processing the value of the first watermarked level as:

$$L'_a = f(L_a, w_i)$$

wherein,
levels are QDCT, Quantized Discrete Cosine Transform, coefficients;
$L'_a$ stands for the value of the first watermarked level;
$L_a$ stands for the first level;
$w_i$ stands for the watermark data;
wherein $f(L_a, w_i)$ is defined such that the first level $L_a$ is obtainable on the basis of the first watermarked level and is processable as:

$$L_a = h(f(L_a, w_i), w_i)$$

Clause 2: The method of clause 1 wherein the value of the first watermarked level is processed as:

$$L'_a = f(L_a, w_i) = \begin{cases} L_a + 1, & \text{if } L_a > l_0, \\ L_a + w_i, & \text{if } L_a = l_0, \\ L_a, & \text{if } -l_0 < L_a < l_0, \\ L_a - w_i, & \text{if } L_a = -l_0, \\ L_a - 1, & \text{if } L_a < -l_0. \end{cases}$$

wherein,
$l_0$ stands for a positive value.

Clause 3. The method according to clause 2, wherein the positive value $l_0$ is 1.

Clause 4. The method according to clause 2, wherein the value of the first watermarked level is processed as:

$$L'_a = f(L_a, w_i) = 2L_a + w_i$$

Clause 5. The method according to clause 1, further comprising:
obtaining a value of a second watermarked level on the basis of a second level of a block, wherein the values of the first and second watermarked levels are obtained by processing them as:

$$(L'_a, L'_b) = f(L_a, L_b, w_i) = (L_a + d^+ + w_i, L_b - d^-)$$

wherein,
$L'_b$ stands for the value of a second watermarked level;
$L_b$ stands for a second level;
and, $$d = L_a - L_b$$

and, $$d^+ = \left\lceil \frac{d}{2} \right\rceil$$

wherein $\lceil \bullet \rceil$ stands for a round operation towards positive infinite;
and, $$d^- = \left\lfloor \frac{d}{2} \right\rfloor$$

wherein $\lfloor \bullet \rfloor$ stands for a round operation towards negative infinite.

Clause 6. The method according to clause 1, further comprising:
obtaining a value of a second watermarked level on the basis of a second level of a block, wherein the values of the first and second watermarked levels are obtained by processing them as:

$$(L'_a, L'_b) = f(L_a, L_b, w_i) = [L_a L_b + w_i L_a]$$

wherein,
$L'_b$ stands for the value of a second watermarked level;
$L_b$ stands for a second level;
wherein $L_a > 1$ Clause 7. The method according to clause 6, wherein the processing of the first and the second watermarked level is carried out with integers or with elements of a multiplicative group modulo p, for a prime number $p > L_a$.

Clause 8. The method according to any of clauses 5-6, wherein each of the first and second levels is selected from different blocks of the video signal.

Clause 9. The method according to any of clauses 1-8, wherein before obtaining the value of a first watermarked level, the method comprises:
selecting at least one block which comprises, in a position greater than a predetermined threshold position, a level different from zero;
using the latest non-zero level of the block as a basis for obtaining the watermarked level.

Clause 10. The method according to any of clauses 1-9, wherein watermark data is encrypted through at least one encryption operation E on the basis of a secret stream of bits S and a key K by processing a value of an encrypted watermark data $w_{ENC}$ as:

$$w_{ENC}=E(K,S)$$

Clause 11. A computer program comprising program instructions for causing an encoding device to perform a method according to any of clauses 1 to 10 of embedding a watermark data in a video signal.

Clause 12. The computer program according to clause 11, embodied on a storage medium and/or a carrier signal.

Clause 13. An encoding device comprising:
means for obtaining watermark data;
means for obtaining at least one value of a first watermarked level on the basis of at least one first level of a block by processing the value of the first watermarked level as:

$$L'_a=f(L_a,w_i)$$

wherein,
$L'_a$ stands for the value of the first watermarked level;
$L_a$ stands for the first level;
$w_i$ stands for the watermark data;
wherein $f(L_a, w_i)$ is defined such that the first level $L_a$ is obtainable on the basis of the first watermarked level and is processable as:

$$L_a=h(f(L_a,w_i),w_i)$$

wherein the block is comprised in a video signal to be entropy coded and the watermark data comprises at least one bit.

Clause 14. An encoding device comprising a memory and a processor, embodying instructions stored in the memory and executable by the processor, the instructions comprising functionality to execute a method according to any of clauses 1 to 10 of embedding a watermark data in a video signal.

Clause 15. A method of detecting a watermark in a video signal, the video signal having been entropy decoded and comprising at least one block with at least one first watermarked level and the watermark data comprising at least one bit, the method comprises:
receiving the video signal;
obtaining watermark data $w_i'$ on the basis of the first watermarked level;
determining a tampering indicator by verifying whether the obtained watermark data $w_i'$ corresponds with a watermark data $w_i$ embedded by a method according to any of clauses 1 to 10 of embedding watermark.

Clause 16. The method according to clause 15, further comprising:
recovering at least one first level from the block on the basis of the watermarked level of the entropy decoded video signal.

Clause 17. The method according to clause 15, wherein before obtaining watermark data $w_i'$ on the basis of the first watermarked level, the method comprises:
selecting at least one block which comprises, in a position greater than a predetermined threshold position, a level different from zero;
using the latest non-zero level of the block as a basis for obtaining the watermark data $w_i'$.

Clause 18. The method according to clause 15, wherein obtaining watermark data $w_i'$ from at least one block of the video signal comprises:
processing a value of the watermark data $w_i'$ as:

$$w_i'=g(\tilde{L}_a)$$

wherein,
$\tilde{L}_a$ stands for a first watermarked level of the block of the video signal having been entropy decoded.

Clause 19. The method according to clause 16, wherein reconstructing/recovering at least the first level from the block comprises:
processing a value of the first level $L''_a$ as:

$$L''_a=h(\tilde{L}_a,w_i')$$

wherein,
$\tilde{L}_a$ stands for a first watermarked level of the block of the video signal having been entropy decoded.

Clause 20. The method according to clause 18, wherein the value of the watermark data $w_i'$ is processed as:

$$w_i' = g(\tilde{L}_a) = \begin{cases} 0, & \text{if } \tilde{L}_a = l_0 \text{ or } \tilde{L}_a = -l_0, \\ 1, & \text{if } \tilde{L}_a = l_0+1 \text{ or } \tilde{L}_a = -l_0-1, \\ \text{there is no watermark bit}, & \text{if } \tilde{L}_a \neq l_0, -l_0, l_0+1, -l_0-1. \end{cases}$$

wherein,
$l_0$ stands for a positive value of a level.

Clause 21. The method according to clause 20, wherein the positive value of the level $l_0$ is 1.

Clause 22. The method according to clause 18, wherein the value of the watermark data $w_i'$ is processed as:

$$w_i'=g(\tilde{L}_a)=\tilde{L}_a \bmod 2$$

wherein "mod" stands for a positive modulo operation.

Clause 23. The method according to clause 18, wherein watermark data $w_i'$ is obtained on the basis of at least the first and a second watermarked level of the video signal, wherein a value of the watermark data $w_i'$ is obtained by processing it as:

$$w_i'=g(\tilde{L}_a,\tilde{L}_b)=\tilde{d} \bmod 2$$

wherein,
$\tilde{L}_b$ stands for the second level of the block of the video signal having been entropy decoded;
$\tilde{d}=\tilde{L}_a-\tilde{L}_b$; and
"mod" stands for a positive modulo operation.

Clause 24. The method according to clause 18, wherein watermark data $w_i'$ is obtained on the basis of at least the first and a second watermarked level of the video signal, wherein a value of the watermark data $w_i'$ is obtained by processing it as:

$$w_i'=g(\tilde{L}_a,\tilde{L}_b)=\tilde{L}_a \bmod \tilde{L}_b$$

wherein,
$\tilde{L}_b$ stands for the second level of the block of the video signal having been entropy decoded; and
"mod" stands for a positive modulo operation.

Clause 25. The method according to any of clauses 23-24, wherein each of the first and second watermarked levels is selected from different blocks of the entropy decoded video signal.

Clause 26. The method according to clause 19, wherein the value of the first level $L''_a$ is obtained by processing it as:

$$L''_a = h(\tilde{L}_a) = \begin{cases} \tilde{L}_a - 1, & \text{if } \tilde{L}_a > l_0, \\ \tilde{L}_a, & \text{if } -l_0 < \tilde{L}_a < l_0, \\ \tilde{L}_a + 1, & \text{if } \tilde{L}_a < -l_0. \end{cases}$$

wherein,
$l_0$ stands for a positive value of a level.

Clause 27. The method according to clause 19, wherein the value of the first level $L''_a$ is obtained by processing it as:

$$L''_a = h(\tilde{L}_a) = \left\lfloor \frac{\tilde{L}_a}{2} \right\rfloor$$

wherein $\lfloor \bullet \rfloor$ stands for a round operation towards negative infinite.

Clause 28. The method according to clause 19, wherein it further comprises:
recovering a second level from the block on the basis of a second level of the entropy decoded video signal, wherein values of the first and second levels $L''_a$, $L''_b$ are obtained by processing them as:

$$(L''_a, L''_b) = h(\tilde{L}_a, \tilde{L}_b, w'_i) = \left( \tilde{L}_a - \left\lceil \frac{\hat{d}}{2} \right\rceil - w'_i, \tilde{L}_b + \left\lfloor \frac{\hat{d}}{2} \right\rfloor \right)$$

wherein,
$\tilde{L}_b$ stands for the second level of the block of the video signal having been entropy decoded;

$$\hat{d} = \frac{\tilde{d} - w'_i}{2} \text{ and } \tilde{d} = \tilde{L}_a - \tilde{L}_b$$

wherein $\lceil \bullet \rceil$ stands for a round operation towards positive infinite;
wherein $\lfloor \bullet \rfloor$ stands for a round operation towards negative infinite.

Clause 29. The method according to clause 19, further comprising:
recovering a second level from the block on the basis of a second level of the entropy decoded video signal, wherein values of the first and second levels $L''_a$, $L''_b$ are obtained by processing them as:

$$(L''_a, L''_b) = h(\tilde{L}_a, \tilde{L}_b, w'_i) = \left( \tilde{L}_b, \frac{\tilde{L}_a - w'_i}{\tilde{L}_b} \right)$$

wherein,
$\tilde{L}_b$ stands for the second level of the block of the video signal having been entropy decoded.

Clause 30. The method according to any of clauses 15-29, wherein after determining a tampering indicator, the method further comprises:
determining an attack indicator by detecting positions of sparse binary errors relative to each other at least in a macroblock.

Clause 31. A computer program comprising program instructions for causing a decoding device to perform a method according to any of clauses 15 to 30 of detecting a watermark in a video signal.

Clause 32. The computer program according to clause 31, embodied on a storage medium and/or a carrier signal.

Clause 33. A decoding device comprising:
means for receiving an entropy decoded video signal, wherein the video signal comprises a block with a first watermarked level;
means for obtaining watermark data $w_i'$ on the basis of the first watermarked level of the block of the video signal;
means for determining a tampering indicator by verifying whether the obtained watermark data $w_i'$ corresponds with a watermark data $w_i$ embedded by a method according to any of clauses 1 to 10 of embedding watermark.

Clause 34. The decoding device according to clause 33, further comprising:
means for recovering at least one first level from the block on the basis of a level of the entropy decoded video signal.

Clause 35. A decoding device comprising a memory and a processor, embodying instructions stored in the memory and executable by the processor, the instructions comprising functionality to execute a method according to any of clauses 15 to 30 of detecting a watermark in a video signal.

The invention claimed is:

1. A method of embedding a watermark data in a video signal to be entropy coded, wherein the video signal comprises at least one block with levels and the watermark data comprises at least one bit, the method comprising:
obtaining watermark data;
obtaining at least one value of a first watermarked level on the basis of at least one first level of the block by processing the value of the first watermarked level as:

$$L'_a = f(L_a, w_i)$$

wherein,
the levels are QDCT, Quantized Discrete Cosine Transform, coefficients;
$L'_a$ stands for the value of the first watermarked level;
$L_a$ stands for the at least one first level of the block;
$w_i$ stands for the watermark data;
wherein $f(L_a, w_i)$ is defined such that the at least one first level of the block $L_a$ is obtainable on the basis of the first watermarked level and is processable as:

$$L_a = h(f(L_a, w_i), w_i)$$

and wherein the value of the first watermarked level is processed as:

$$L'_a = f(L_a, w_i) = \begin{cases} L_a + 1, & \text{if } L_a > l_0, \\ L_a + w_i, & \text{if } L_a = l_0, \\ L_a, & \text{if } -l_0 < L_a < l_0, \\ L_a - w_i, & \text{if } L_a = -l_0, \\ L_a - 1, & \text{if } L_a < -l_0. \end{cases}$$

wherein,
$l_0$ stands for a positive value;
the method further comprising embedding the watermark data in the video signal in accordance with the obtaining the watermark data and the obtaining the at least one value of the first watermarked level.

2. The method according to claim 1, wherein the positive value $l_0$ is 1.

3. The method according to claim 1, wherein the value of the first watermarked level is processed as:

$$L'_a = f(L_a, w_i) = 2L_a + w_i$$

4. The method according to claim 1, further comprising:
obtaining a value of a second watermarked level on the basis of a second level of a block, wherein the values of the first and second watermarked levels are obtained by processing them as:

$$(L'_a, L'_b) = f(L_a, L_b, w_i) = (L_a + d^+ + w_i, L_b - d^-)$$

wherein,
L'$_b$ stands for the value of a second watermarked level;
L$_b$ stands for a second level;
and, $$d = L_a - L_b$$

and, $$d^+ = \left\lceil \frac{d}{2} \right\rceil$$

wherein $\lceil \cdot \rceil$ stands for a round operation towards positive infinite;
and, $$d^- = \left\lfloor \frac{d}{2} \right\rfloor$$

wherein $\lfloor \cdot \rfloor$ stands for a round operation towards negative infinite.

5. The method according to claim 1, further comprising:
obtaining a value of a second watermarked level on the basis of a second level of a block, wherein the values of the first and second watermarked levels are obtained by processing them as:

$$(L'_a, L'_b) = f(L_a, L_b, w_i) = [L_a L_b + w_i L_a]$$

wherein,
L'$_b$ stands for the value of a second watermarked level;
L$_b$ stands for a second level;
wherein L$_a$>1.

6. An encoding device comprising a non-transitory memory and a processor, the non-transitory memory storing instructions which, when executed by the processor, perform a method of embedding a watermark data in a video signal to be entropy coded, wherein the video signal comprises at least one block with levels and the watermark data comprises at least one bit, the method comprising:
obtaining watermark data;
obtaining at least one value of a first watermarked level on the basis of at least one first level of the block by processing the value of the first watermarked level as:

$$L'_a = f(L_a, w_i)$$

wherein,
the levels are QDCT, Quantized Discrete Cosine Transform, coefficients;
L'$_a$ stands for the value of the first watermarked level;
L$_a$ stands for the at least one first level of the block;
w$_i$ stands for the watermark data;
wherein $f(L_a, w_i)$ is defined such that the at least one first level of the block L$_a$ is obtainable on the basis of the first watermarked level and is processable as:

$$L_a = h(f(L_a, w_i), w_i)$$

and wherein the value of the first watermarked level is processed as:

$$L'_a = f(L_a, w_i) = \begin{cases} L_a + 1, & \text{if } L_a > l_0, \\ L_a + w_i, & \text{if } L_a = l_0, \\ L_a, & \text{if } -l_0 < L_a < l_0, \\ L_a - w_i, & \text{if } L_a = -l_0, \\ L_a - 1, & \text{if } L_a < -l_0. \end{cases}$$

wherein,
l$_0$ stands for a positive value;
the method further comprising embedding the watermark data in the video signal in accordance with the obtaining the watermark data and the obtaining the at least one value of the first watermarked level.

7. A method of detecting a watermark in a video signal, the video signal having been entropy decoded and comprising at least one block with at least one first watermarked level and the watermark data comprising at least one bit, the method comprises:
receiving the video signal;
obtaining watermark data w$_i$' on the basis of the first watermarked level;
determining a tampering indicator by verifying whether the obtained watermark data w$_i$' corresponds with a watermark data w$_i$ embedded by the method according to claim 1.

8. The method according to claim 7, further comprising:
recovering at least one first level from the block on the basis of the watermarked level of the entropy decoded video signal.

9. The method according to claim 7, wherein before obtaining watermark data w$_i$' on the basis of the first watermarked level, the method comprises:
selecting at least one block which comprises, in a position greater than a predetermined threshold position, a level different from zero;
using the latest non-zero level of the block as a basis for obtaining the watermark data w$_i$'.

10. The method according to claim 7, wherein obtaining watermark data w$_i$' from at least one block of the video signal comprises:
processing a value of the watermark data w$_i$' as:

$$w_i' = g(\tilde{L}_a)$$

wherein,
$\tilde{L}_a$ stands for a first watermarked level of the block of the video signal having been entropy decoded.

11. The method according to claim 7, further comprising:
recovering at least one first level from the block on the basis of the watermarked level of the entropy decoded video signal,
wherein the recovering at least the first level from the block comprises:
processing a value of the first level L''$_a$ as:

$$L''_a = h(\tilde{L}_a, w_i')$$

wherein,
$\tilde{L}_a$ stands for a first watermarked level of the block of the video signal having been entropy decoded.

12. The method according to claim 7, further comprising:
recovering at least one first level from the block on the basis of the watermarked level of the entropy decoded video signal,
wherein the value of the watermark data w$_i$' is processed as:

$$w_i' = g(\tilde{L}_a) = \begin{cases} 0, & \text{if } \tilde{L}_a = l_0 \text{ or } \tilde{L}_a = -l_0, \\ 1, & \text{if } \tilde{L}_a = l_0 + 1 \text{ or } \tilde{L}_a = -l_0 - 1, \\ \text{there is no watermark bit}, & \text{if } \tilde{L}_a \neq l_0, -l_0, l_0 + 1, -l_0 - 1. \end{cases}$$

wherein,
l$_0$ stands for a positive value of a level.

13. The method according to claim 7, wherein obtaining watermark data from at least one block of the video signal comprises:
processing a value of the watermark data $w_i'$ as:

$$w_i'=g(\tilde{L}_a)$$

wherein,
$\tilde{L}_a$ stands for a first watermarked level of the block of the video signal having been entropy decoded,
wherein the value of the watermark data $w_i'$ is processed as:

$$w_i'=g(\tilde{L}_a)=\tilde{L}_a \bmod 2$$

wherein "mod" stands for a positive modulo operation.

14. The method according to claim 7, wherein obtaining watermark data $w_i'$ from at least one block of the video signal comprises:
processing a value of the watermark data $w_i'$ as:

$$w_i'=g(\tilde{L}_a)$$

wherein,
$\tilde{L}_a$ stands for a first watermarked level of the block of the video signal having been entropy decoded,
wherein watermark data $w_i'$ is obtained on the basis of at least the first and a second watermarked level of the video signal, wherein a value of the watermark data $w_i'$ is obtained by processing it as:

$$w_i'=g(\tilde{L}_a,\tilde{L}_b)=\tilde{d} \bmod 2$$

wherein,
$\tilde{L}_b$ stands for the second level of the block of the video signal having been entropy decoded;
$\tilde{d}=\tilde{L}_a-\tilde{L}_b$; and
"mod" stands for a positive modulo operation.

15. The method according to claim 7, wherein obtaining watermark data $w_i'$ from at least one block of the video signal comprises:
processing a value of the watermark data $w_i'$ as:

$$w_i'=g(\tilde{L}_a)$$

wherein,
$\tilde{L}_a$ stands for a first watermarked level of the block of the video signal having been entropy decoded,
wherein watermark data $w_i'$ is obtained on the basis of at least the first and a second watermarked level of the video signal, wherein a value of the watermark data $w_i'$ is obtained by processing it as:

$$w_i'=g(\tilde{L}_a,\tilde{L}_b)=\tilde{L}_a \bmod \tilde{L}_b$$

wherein,
$\tilde{L}_b$ stands for the second level of the block of the video signal having been entropy decoded; and
"mod" stands for a positive modulo operation.

16. The method according to claim 7,
wherein obtaining watermark data $w_i'$ from at least one block of the video signal comprises:
processing a value of the watermark data $w_i'$ as:

$$w_i'=g(\tilde{L}_a)$$

wherein,
$\tilde{L}_a$ stands for a first watermarked level of the block of the video signal having been entropy decoded,
wherein watermark data $w_i'$ is obtained on the basis of at least the first and a second watermarked level of the video signal,
wherein each of the first and second watermarked levels is selected from different blocks of the entropy decoded video signal.

17. The method according to claim 7, further comprising:
recovering at least one first level from the block on the basis of the watermarked level of the entropy decoded video signal,
wherein the recovering at least the first level from the block comprises:
processing a value of the first level $L''_a$ as:

$$L''_a=h(\tilde{L}_a,w_i')$$

wherein,
$\tilde{L}_a$ stands for a first watermarked level of the block of the video signal having been entropy decoded,
wherein the value of the first level $L''_a$ is obtained by processing it as:

$$L''_a = h(\tilde{L}_a) = \begin{cases} \tilde{L}_a - 1, & \text{if } \tilde{L}_a > l_0, \\ \tilde{L}_a, & \text{if } -l_0 < \tilde{L}_a < l_0, \\ \tilde{L}_a + 1, & \text{if } \tilde{L}_a < -l_0. \end{cases}$$

wherein,
$l_0$ stands for a positive value of a level.

18. The method according to claim 7, further comprising:
recovering at least one first level from the block on the basis of the watermarked level of the entropy decoded video signal,
wherein the recovering at least the first level from the block comprises:
processing a value of the first level $L''_a$ as:

$$L''_a=h(\tilde{L}_a,w_i')$$

wherein,
$\tilde{L}_a$ stands for a first watermarked level of the block of the video signal having been entropy decoded,
wherein the value of the first level $L''_a$ is obtained by processing it as:

$$L''_a = h(\tilde{L}_a) = \left\lfloor \frac{\tilde{L}_a}{2} \right\rfloor$$

wherein $\lfloor \cdot \rfloor$ stands for a round operation towards negative infinite.

19. The method according to claim 7, wherein after the determining a tampering indicator, the method further comprises:
determining an attack indicator by detecting positions of sparse binary errors relative to each other at least in a macroblock.

20. The method according to claim 7 performed by a decoding device.

* * * * *